INVENTORS
HENRY I. MAHON
MERWYN C. GILL
BY
ATTORNEY

United States Patent Office 2,977,884
Patented Apr. 4, 1961

2,977,884

PROPELLANT GRAIN RESTRICTION

Henry I. Mahon, Honolulu, Hawaii, and Merwyn C. Gill, Los Angeles, Calif., assignors, by mesne assignments, to Aerojet-General Corporation, Cincinnati, Ohio, a corporation of Ohio Filed Aug. 11, 1950, Ser. No. 178,816

16 Claims. (Cl. 102—98)

This invention relates to propellants of the solid type used in rocket motors and in particular to solid propellants made by polymerizing oxidizer-resin mixtures.

The principal object of this invention is to provide a liner or restriction which is capable of effectively bonding itself to the walls of such a resin-oxidizer propellant charge, thereby preventing unwanted burning on the lined surfaces when the grain is exposed to flames and hot gases released during burning.

It has been a common practice to form a solid propellant charge in the form of a stick or grain and to insert such a charge, after curing, into the chamber of a rocket motor.

When burning occurs on most or all surfaces, the grain is said to be burning unrestrictedly. Such unrestricted burning often generates indeterminately high pressures, and unless the motor is designed to withstand excessive pressure the chamber may explode. To avoid unrestricted and nonuniform burning of a propellant grain, it has been the practice to line the surfaces of the grain on which no burning is desired with a slower burning, or nonburning material. The liner should adhere closely to the walls of the propellant charge, thereby preventing the flames and hot gases generated during combustion from reaching and igniting the surfaces of the propellant grain which are covered by the liner.

A resin which has been found particularly useful in compounding solid propellant charges of the foregoing type, is a polymerized polyester resin base material. Such polyester resin base propellants utilize as oxidizers inorganic compounds, preferably the perchlorates, such as ammonium or potassium perchlorates; however, other stable oxidizers such as the inorganic nitrates, permaganates and chromates, may be used. These substances have been more completely disclosed in the copending patent application of Roy Roberts, Serial No. 109,409, filed August 9, 1949, and assigned to the same assignee as the present application.

It has been experienced that the surface of grains or charges compounded of an alkyl or polyester type resin as a binder, has sometimes not bonded satisfactorily to the liners. This has been due to the difficulty in producing an adherence of the liner material to the surface of a cured alkyd or polyester resin base charge.

While some liners appear to bond fairly well and to adhere to grains of the above-mentioned composition at ambient temperatures, sometimes such liners have separated from the grain when subjected to higher or lower temperatures. This is partly due to the fact that the physical properties of the liner materials usually vary considerably from those of the resin used to bind the propellant charge. When chilled some liners contract more than the resin in the charge and if the liner material becomes brittle at low temperatures, it may crack away from the charge, leaving exposed surfaces for burning. When heated, some liners may expand considerably more than the resin in the charge, causing such liner to buckle. In some cases the liner becomes soft enough to flow, leaving the charge entirely unprotected.

In accordance with our invention, we have discovered a coating material arrangement which has suitable properties for lining a polyester resin base charge. A feature of the lining arrangement is the provision of a resinous laminate which comprises a plurality of layers of fabric, such as glass cloth, metal cloth, fiber cloth and the like impregnated with a resinous material comprising a polyester resin with which there is incorporated a monomeric olefinic component such as a vinyl compound or other olefinic compound capable of cross-linking with the resin and compatible with the liquid resin; the polyester being the reaction product of a polycarboxylic acid with a polyhydric alcohol.

A related feature is the coating of the surface of the grain itself with a somewhat similar but preferably harder polyester resin than that used to form the laminate. This resin is applied to the surface of the grain and serves to cement the laminate to the grain when the resin between the surface of the grain and the surface of the laminate has been cured.

The foregoing and other features of the invention will be better understood from the following detailed description and the accompanying drawing of which:

Figure 1:
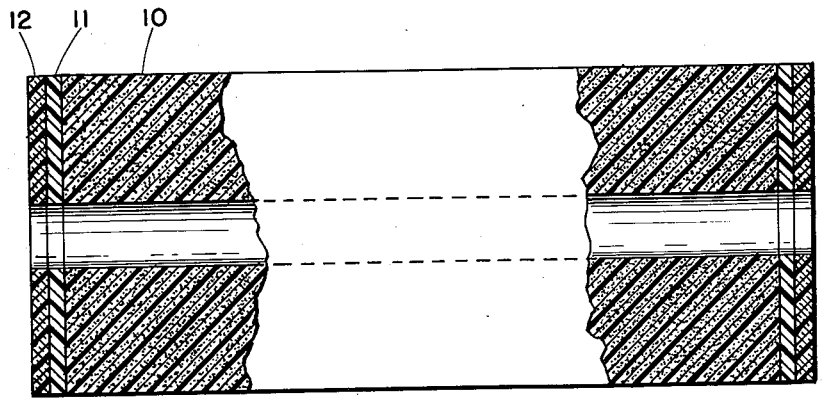
Fig. 1 shows a cross section view taken through a propellant grain which is lined in accordance with this invention.
Figure 2:
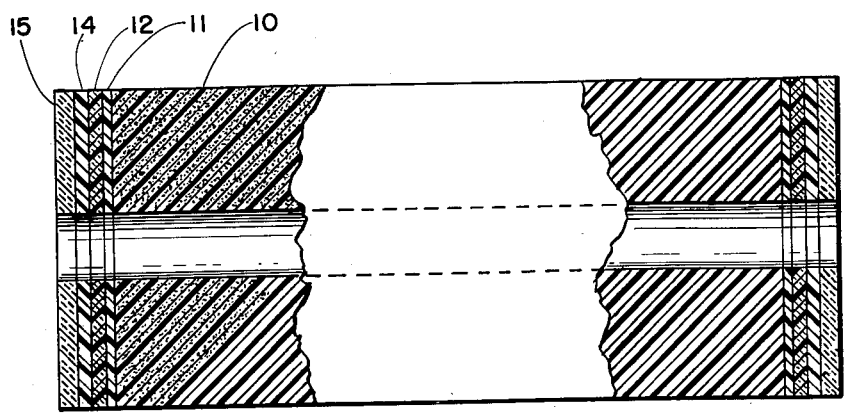
Fig. 2 shows a broken view of the surface of the propellant grain of Fig. 1 protected by additional heat-resisting layers.
Figure 3:
Fig. 3 is an enlarged section of the laminate 12.

Polyester resins suitable as binder resins for propellant grains are set forth in the said Roberts application Serial No. 109,409. One which is particularly suitable for the formation of a propellant grain or charge can be compounded by reacting 4 moles of sebacic acid, 5 moles of propylene glycol and 1 mole of maleic anhydride. Such a resin will hereafter be referred to as Resin A. The addition of styrene to the condensation product obtained by reacting the above compounds will cause heteropolymerization of the polyester resin and permit the resin to become thermosetting after heteropolymerization; and the amount of styrene added to the resin determines the degree of flexibility of the finished product. A suitable catalyst, such as benzoyl peroxide, tertiary butyl hydroperoxide, etc., can be employed to facilitate the heteropolymerization of the resin. After curing the polymerized products are not materially affected by either heat or cold. It should be understood that this is but one example of a polyester resin of this general type useful for making a grain to which the liner material of the present invention is applicable. Other examples of polyester resins of this general type, useful for making grains are as follows:

A condensation product made by reacting 7 moles of adipic acid, 3 moles of maleic anhydride and 11 moles of ethylene glycol. This resin will hereafter be referred to as Resin B.

A condensation product formed by reacting 7 moles of adipic acid, 3 moles of maleic anhydride and 12 moles of diethylene glycol. This resin will be referred to hereafter as Resin C.

A condensation product formed by reacting 1 mole diethylene glycol, 0.9 mole of adipic acid and 0.1 mole maleic anhydride. This resin will be referred to hereafter as Resin D.

A condensation product formed by reacting 1 mole polypropylene glycol 425 (m.w.), 0.9 mole adipic acid and 0.1 mole maleic anhydride. This resin will be referred to hereafter as Resin E.

A condensation product formed by 1 mole polypropylene glycol 425 (m.w.), 0.8 mole adipic acid and 0.2 mole maleic anhydride. This resin will hereafter be rerefred to as Resin F.

A condensation product formed by reacting 1 mole polyethylene glycol 300 (m.w.), 0.9 mole adipic acid, and 0.1 mole maleic anhydride. This resin will hereafter be designated as Resin G.

A condensation product formed by reacting 1 mole polyethylene glycol 300 (m.w.), 0.8 mole adipic acid, and 0.2 mole maleic anhydride. This resin will hereafter be referred to as Resin H.

Examples of the vinyl or other olefinic monomers capable of copolymerizing with the polyester resin are: vinyl compounds such as styrene, esters of acrylic and methacrylic acid such as methylacrylate and methyl methacrylate, and derivatives of vinyl alcohol, such as vinyl acetate, acrylonitrile, etc. Other examples of compounds capable of cross-linking with the polyesters are diethylene glycol bis-(allyl carbonate), diallyl phthalate, diallyl maleate, diallyl diglycollate, diacrylate of esters of diglycol such as diethylene glycol diacrylate, ethylene glycol acrylate, propylene glycoldiacrylate, butandiol-1,3-diacrylate, etc.

In order to form a propellant charge a suitable oxidizer is added to the polyester resin-olefinic copolymerizing monomer, capable of cross-linking with the polyester resin, by stirring and mixing. It is preferable to add the oxidizer to the mixture when the resin is still in the liquid stage. Examples of suitable oxidizers are inorganic compounds including the chromates, dichromates, perchlorates of metal such as the alkali metals, namely sodium, lithium, potassium, rubidium, and caesium, and inorganic compounds of the above anions in combination with non-metallic radicals such as the ammonium radical and hydrazine. The selection of the oxidizer material depends upon the type of propellant and the specific burning properties desired. The preferred oxidizers are the perchlorates, especially the perchlorates of potassium and ammonium. The amount of oxidizer added to the resinous mixture usually is between 45%–90% by weight of the total propellant composition and the weight of the polyester resin-olefinic cross-linking compound mixture should lie between 55%–10% by weight of the propellant.

Catalytic substances are particularly useful for speeding up the rate of polymerization of the said polyester resin monomer mixtures with the oxidizer added. Such catalytic substances are the organic peroxides and the organic peresters. The temperature used for curing is dependent somewhat upon the nature of the catalyst and the time during which it is desired to accomplish complete polymerization.

The organic peroxides or peresters should be preferably soluble or compatible with the polyester resin. However, in some instances even an insoluble organic peroxide or perester may function as a catalyst as long as it can be made to decompose and liberate a free oxygen radical. Specific examples of compounds which are suitable catalysts for this polymerization reaction are: tertiary-butyl hydroperoxide, cumene hydroperoxide, benzoyl peroxide, lauryl peroxide, acetobenzoyl peroxide, ditertiary butyl peroxide, methyl ethyl ketone peroxide, 1-hydroxycyclohexyl hydroperoxide-1, cycloalkane hydrocarbon peroxides and other hydro peroxides which are not too volatile at the curing temperature.

Some catalysts, such as 1-hydroxycyclohexyl hydroperoxide-1, cumene hydroperoxide, are capable of polymerizing certain resins such as Resin A at room temperature provided that the resin and the catalyst are left to cure for a sufficient period of time.

Specific examples of suitable peresters are: tertiary-butyl perbenzoate, and ditertiary-butyl diperphthalate.

Such catalyst should be present in the polyester resin-vinyl or other suitable monomer mixture during the time it is subjected to the curing process. In general, the weight of the catalyst employed to bring about this result is approximately 0.5% by weight based on the weight of the combined polyester resin-vinyl or other suitable monomer mixture. If desired, larger amounts of the catalysts may be employed than those indicated.

In order to provide steady burning at low pressure with some oxidizers, it is beneficial to incorporate into the propellant mass approximately 1% by weight of carbon black which is added to the liquid mixture at the time the oxidizer is incorporated therein and before the mixture is cured.

The manner in which I prefer to compound the propellant is as follows: The amount of oxidizer required to cause the fuel to oxidize to the proper degree is uniformly stirred into the liquid polyester resin-vinyl, or other suitable monomer mixture. Stirring is continued at room temperature until all of the oxidizer has been added and the mixture has a uniform consistency. A catalyst capable of accelerating polymerization of the resin mixture is added thereto and intimately incorporated therein before or at the time the oxidizer is added. The stirred mixture, with the catalyst incorporated therein, is cast into a suitable mold, ordinarily cylindrical in outline, and the material is allowed to cure. The cast mass is generally cured at temperatures ranging from ambient to 220° F. If lower temperatures are used, the charge may require a considerable period of time to cure. If a shorter time is desired, more elevated temperatures may be used.

The foregoing description of the manner of making the grain is no part of the present invention and is given in order to afford a good understanding of the type of grain with which the present invention is used.

Referring now to the drawing, there is shown a cross section view taken through a cylindrical-shaped propellant grain or charge 10 of the polyester resin-oxidizer type. In accordance with this invention there is provided on the grain a coating 11 which is also a polyester resin base material and over this coating there is applied the fabric laminate 12 which is also made by employing a polyester resin similar to the one used in the charge as is described hereafter in detail. The exposed surface of the laminate 12 may be coated with a layer of thermoplastic cement 14 to which there is subsequently applied a layer 15 of heat insulating material such as asbestos. This protective layer insulates the grain against the action of the hot gases and flames and may be cemented to the fabric laminate after the resin, which binds the resin to the grain, has been cured. Any suitable adhesive substance may be used to attach the asbestos or other insulating sheet to the laminate. A satisfactory form of adhesive for the above purpose is a thermoplastic cement obtained by dissolving cyclonized synthetic rubber in methyl ethyl ketone. This product is available under the trade-name of "Pliobond 30 Cement."

The laminate 12, as stated above, comprises a plurality of layers of fabric material bound together by a polyester resin in which there has been incorporated a vinyl or other olefinic monomer capable of cross-linking with the polyester resin and can be made as follows: A polyester resin, for example, a resin similar to Resin A, formed by reacting a polyhydric alcohol with an unsaturated polycarboxylic acid and one or more saturated polycarboxylic acids, is mixed with a vinyl type of monomer or other olefinic monomers capable of cross-linking with the condensation product, such as styrene, methylacrylate, methyl methacrylate or any of the other olefinic compounds listed above. The fabric layers which may be a glass, metal or fiber cloth are impregnated with the unpolymerized resin-vinyl monomer mixture. These impregnated fabric sheets are positioned one on top of the other and compressed together, forming a single, thick laminated sheet. The pressed laminate is then cured, fusing all the fabric layers into a single laminate. These laminates, made of any suitable thickness, are strong yet flexible, provided the sheets are not made too thick; and when the fabric employed is glass cloth, and the laminate has the advantage that it is fairly transparent. The cured laminate may now be applied to those surfaces of a propellant charge upon which no burning is desired, and cemented thereto with a compatible resin. Although the plastic binder used in forming the propellant charge itself will usually contain the same type of polyester resin as that used in forming the laminate, it should be understood that the amount of the cross-linking agent, such as styrene, used in forming the propellant may be smaller or larger than that used in the binder resin applied to the fabric layers to form the laminate.

The heteropolymerizable resin preferred for impregnating the fabric layers described above is Resin A hereinabove described for use in making the grain itself. However, any of the other polyester resins, such as those described above for forming the propellant charge may be substituted in place of Resin A.

The coating 11 on the surface of the grain performs the function of cementing the fabric laminate intimately to the grain after both the grain and the laminate have been cured. This coating 11 is also a form of polyester resin and a particularly useful form of such resin for this purpose is obtained by mixing the condensation product resulting from the reaction of a polyhydric alcohol or alcohols and an unsaturated polycarboxylic acids with a vinyl monomer or other olefinic compounds capable of cross-linking with the resin. These vinyl monomers are the same as previously disclosed in forming the propellant charge, the preferred substances being styrene, methyl acrylate, methyl methacrylate, etc.

The unsaturated polycarboxylic acids, which may be reacted to form this class of polyester resins are the aromatic polycarboxylic acids such as phthalic acid, isophthalic, terephthalic and naphthalic acids; unsaturated polycarboxylic acids such as fumaric or maleic acids, etc.; and anhydrides of both the unsaturated acids and the aromatic acids, such as maleic anhydride and phthalic anhydride. It is also possible to employ combinations of the unsaturated acids and anhydrides, if desired.

Examples of the polyhydric alcohols which may be employed in forming the polyester resin of this type are the diethylene glycol, ethylene glycol, propylene glycol, triethylene glycol, propane-1,2-diol, trimethylene glycol, and butane-2,3-diol.

A specific example of a typical resin, suitable for cementing the cured laminate to the propellant grain, is one comprising the condensation product obtained by reacting 3 moles of diethylene glycol with 3.6 moles of ethylene glycol, 2.0 moles of phthalic anhydride, 3.4 moles of fumaric acid. This resin will hereafter be referred to as Resin X.

Resin X is considerably harder than Resin A, which is used in forming the laminate and propellant, and this harder quality is desired in order that it may well perform its function of tenaciously adhering to both the grain surface and of cementing itself to the laminate.

Polyester resins similar to Resin X tend to polymerize on standing at ambient conditions, due to the high degree of unsaturation in the molecule. If they are to be preserved for any length of time before use, these resins should be inhibited against polymerization, for example, by adding to the liquid polyester resin a small percentage of an inhibitor such as hydroquinone or catechol. These substances effectively inhibit polymerization until a strong polymerization catalyst, such as the organic peroxide, for example, benzoyl peroxide or a perester is added.

After the application of the liquid Resin X with one of the cross-linking agents described above to the surface of the grain, the cured laminate is applied over the coating of liquid Resin X; and the grain thus lined is subjected to a temperature cure to polymerize the highly unsaturated Resin X-cross-linking agent mixture. When cured this resin permanently cements the laminate to the grain surface.

The manner in which the restriction is applied to the propellant grain is as follows: The portions of the polymerized propellant grain which are to be restricted against burning are first scrubbed clean with a volatile solvent such as acetone, ether, petroleum ether, etc., to remove any dust or perchlorate particles, or any foreign material adhering to the surface. Unless the propellant grain is well cleaned the reliability of the restriction is materially lowered.

The fabric laminate made from glass cloth, metal cloth, or fiber cloth, which has been prepared by impregnating the individual layers of the fabric with a resin comprises a mixture of Resin A and styrene, or other cross-linking agent. The amount of styrene or other cross-linking agent depends on the degree of cross-linking required; a suitable amount of cross-linking agent being about 50%. Lower amounts of the cross-linking agent tend to make the resulting laminate more flexible. The layers are compressed together and cured. After curing the laminate is cut to the desired shape.

The cured clean surfaces of the propellant to be insulated by the laminate are then painted with Resin X to which has been added vinyl monomer, or other cross-linking agent, capable of copolymerizing with the resin. A catalyst, such as benzoyl peroxide is also incorporated in Resin X before it is applied. The amount of styrene added to the Resin X is dependent upon the desired viscosity of the uncured resin and is generally between 20% and 30% by weight based on the weight of the styrene mixture. The contact surface of the laminate is also coated with a layer of the unpolymerized Resin X. The laminate is then cemented to the cleaned surface or surfaces of the grain to which Resin X has been applied, all air bubbles pressed out, and the entire propellant charge and liner are subjected to curing temperatures and maintained at those temperatures until the layer of resin between the charge and the laminate has become cured. The time required for the curing process of the binder resin is usually short since the layer of resin present between the grain and laminate is fairly thin. Approximately four hours are generally sufficient if the charge and liner are placed in a curing oven which is held between 210° F.–220° F. After curing the fabric laminate is integrally bonded to the surface of the charge.

The restriction contains no oxidizer, therefore, it will burn at a much slower rate than the propellant, for this reason it restricts or inhibits burning. This is not effectively accomplished unless the restriction is intimately bonded to the propellant grain surface in which case it will insulate the propellant surface from the burning temperatures surrounding the propellant restriction. This prevents the insulated propellant surface from burning until all of the grain has been consumed.

An advantage is had when the laminate is of glass or material having a wide mesh, as this makes it possible to observe the surface of the propellant charge after the laminate has been cemented thereto, inasmuch as the cured resin itself is transparent. This makes it possible to detect the presence of any surface imperfections which could expose to burning a greater area than is desired.

The liner according to our invention not only possesses satisfactory properties in tension and in compression, but also serves as an insulator against the flames and hot gases released during the combustion of the charge in the chamber. This increases the reliability of the propellant charge.

We claim:

1. In combustion, a solid propellant charge which comprises a cured intimate mixture of a solid, inorganic oxidizing salt, said inorganic oxidizing salt being present in an amount of from about 45% to 90% by weight of the total propellant composition and an unsaturated polyester resin consisting essentially of the condensation product of a saturated polyhydric alcohol and polycarboxylic acid heteropolymerized with an unsaturated compound selected from the group consisting of lower alkenes, lower alkynes, phenyl substituted lower alkenes, lower alkyl dienes, lower alkenyl esters of lower alkanoic acids, lower alkyl esters of lower alkenoic acids, lower alkenyl esters of lower alkenoic acids, allyl diglycol carbonate, diallyl diglycollate, and mixtures thereof; and a liner covering a portion of said propellant charge which comprises a plurality of fabric layers impregnated and bound together by a laminating resin which consists essentially of an unsaturated polyester resin, consisting essentially of the condensation product of saturated polyhydric alcohol and polycarboxylic acid; heteropolymerized with an unsaturated compound selected from the group consisting of phenyl substituted lower alkenes, lower alkyl esters of lower alkenoic acids, lower alkenyl esters of lower alkenoic acids, lower alkenyl esters of lower alkanoic acids, diethylene glycol bis-(allyl carbonate), lower alkenyl phthalates, lower dialkenyl diglycollates, and di-lower alkenoic acid esters of lower alkanediols, and mixtures thereof; and a cured layer of adhesive resin which consists essentially of an unsaturated polyester resin, consisting essentially of the condensation product of saturated polyhydric alcohol and polycarboxylic acid heteropolymerized with an unsaturated compound selected from the group consisting of lower alkenes, lower alkynes, phenyl substituted lower alkenes, lower alkyl dienes, lower alkenyl esters of lower alkanoic acids, lower alkyl esters of lower alkenoic acids, lower alkenyl esters of lower alkenoic acids, allyl diglycol carbonate, diallyl diglycollate, and mixtures thereof; adhering to said laminate and said propellant charge thereby binding them together.

2. The combination of claim 1 wherein the said polyhydric alcohol ingredient of said laminating resin is propylene glycol and the said polycarboxylic acid ingredient of said laminating resin is a mixture of sebacic acid and maleic anhydride.

3. The combination of claim 1 wherein the said polyhydric alcohol ingredient of said adhesive resin is a mixture of diethylene glycol and ethylene glycol, and the said polycarboxylic acid ingredient of said adhesive resin is a mixture of phthalic anhydride and fumaric acid.

4. The combination of claim 1 wherein a layer of fireproof material is bound to the outer surface of said laminate with a thermosetting plastic cement.

5. The combination of claim 1 wherein said fabric laminate is a glass cloth laminate.

6. The combination of claim 1 wherein said fabric laminate is a metal cloth laminate.

7. The combination of claim 1 wherein said fabric laminate is a fiber cloth laminate.

8. The combination of claim 1 wherein said fireproof material is asbestos.

9. The combination of claim 4 wherein said thermosetting plastic cement is a solution of cyclonized synthetic rubber in methyl ethyl ketone.

10. In combination, a solid propellant charge which comprises from about 45% to about 90% by weight of a solid, inorganic oxidizing salt and from about 55% to about 10% by weight of an unsaturated polyester resin, consisting essentially of the condensation product of saturated polyhydric alcohol and polycarboxylic acid, heteropolymerized with styrene; and a liner covering a portion of said propellant charge which comprises a plurality of fabric layers impregnated and bound together by a laminating resin which consists essentially of an unsaturated polyester resin, consisting essentially of the condensation product of saturated polyhydric alcohol and polycarboxylic acid, heteropolymerized with styrene; and a cured layer of adhesive resin which consists essentially of an unsaturated polyester resin, consisting essentially of the condensation product of saturated polyhydric alcohol and polycarboxylic acid, heteropolymerized with styrene; adhering to said propellant charge and to said laminate thereby binding them together.

11. The combination of claim 10 wherein a layer of fireproof material is bound to the outer surface of said laminate with a thermosetting plastic cement.

12. In combination, a solid propellant charge which comprises from about 45% to about 90% by weight of a solid, inorganic oxidizing salt and from about 55% to about 10% by weight of an unsaturated polyester resin, consisting essentially of the condensation product of saturated polyhydric alcohol and polycarboxylic acid, heteropolymerized with a lower alkyl ester of a lower alkenoic acid; and a liner covering a portion of said propellant charge which comprises a plurality of fabric layers impregnated and bound together by a laminating resin which consists essentially of an unsaturated polyester resin, which consists essentially of the condensation product of saturated polyhydric alcohol and polycarboxylic acid, heteropolymerized with a lower alkyl ester of a lower alkenoic acid; and a cured layer of an adhesive resin which consists essentially of an unsaturated polyester resin, which consists essentially of the condensation product of saturated polyhydric alcohol and polycarboxylic acid, heteropolymerized with a lower alkyl ester of a lower alkenoic acid; adhering to said propellant charge and to said laminate thereby binding them together.

13. In combination, a solid propellant charge which comprises from about 45% to about 90% by weight of a solid, inorganic oxidizing salt and from about 55% to about 10% by weight of an unsaturated polyester resin, consisting essentially of the condensation product of saturated polyhydric alcohol and polycarboxylic acid, heteropolymerized with methyl methacrylate; and a liner covering a portion of said propellant charge which comprises a plurality of fabric layers impregnated and bound together by a laminating resin which consists essentially of an unsaturated polyester resin, which consists essentially of the condensation product of saturated polyhydric alcohol and polycarboxylic acid, heteropolymerized with methyl methacrylate; and a cured layer of an adhesive resin which consists essentially of an unsaturated polyester resin, which consists essentially of the condensation product of saturated polyhydric alcohol and polycarboxylic acid, heteropolymerized with methyl methacrylate; adhering to said propellant charge and to said laminate thereby binding them together.

14. The method of restricting a solid propellant charge consisting of a cured, intimate mixture of a solid, inorganic oxidizing salt, said inorganic oxidizing salt being present in an amount of from about 45% to 90% by weight of the total propellant composition and an unsaturated polyester resin consisting of the condensation product of a saturated polyhydric alcohol and polycarboxylic acid heteropolymerized with an unsaturated compound selected from the group consisting of lower alkenes, lower alkynes, phenyl substituted lower alkenes, lower alkyl dienes, lower alkenyl esters of lower alkanoic acids, lower alkyl esters of lower alkenoic acids, lower alkenyl esters of lower alkenoic acids, allyl diglycol carbonate, diallyl diglycollate, and mixtures thereof; which comprises coating the surface of said charge which is to be restricted with an unpolymerized adhesive mixture of unsaturated alkyd resin consisting essentially of the condensation product of polycarboxylic acid and saturated polyhydric alcohol, and an unsaturated compound selected from the group consisting of phenyl substituted lower alkenes, lower alkyl esters of lower alkenoic acids, lower alkenyl esters of lower alkenoic acids, lower alkenyl esters of lower alkanoic acids, diethylene glycol bis-(allyl carbonate), lower alkenyl phthalates, lower dialkenyl diglycollates, and di-lower alkenoic acid esters of lower alkanediols, and mixtures thereof; applying to said adhesive coating a fabric laminate saturated with an unpolymerized laminating mixture consisting essentially of an unsaturated polyester resin, consisting of the condensation product of saturated polyhydric alcohol and polycarboxylic acid, and an unsaturated compound selected from the group consisting of lower alkenes, lower alkynes, phenyl substituted lower alkenes, lower alkyl dienes, lower alkenyl esters of lower alkanoic acids, lower alkyl esters of lower alkenoic acids, lower alkenyl esters of lower alkenoic acids, allyl diglycol carbonate, diallyl diglycollate, and mixtures thereof; and thereafter polymerizing said adhesive mixture and said laminating mixture so as to bind said laminate to said propellant charge.

15. The method of claim 14 wherein a layer of fireproof material is bound to the outer surface of said laminate after the said polymerization step.

16. The method of claim 14 wherein said propellant grain is washed with a volatile solvent prior to coating the surface of said grain with said unpolymerized adhesive mixture.

References Cited in the file of this patent

UNITED STATES PATENTS

| | | |
|---|---|---|
| 1,809,984 | Mains | June 16, 1931 |
| 2,229,208 | Holm et al. | Jan. 21, 1941 |
| 2,429,688 | Hoover | Oct. 28, 1947 |
| 2,443,736 | Kropa | June 22, 1948 |
| 2,443,739 | Kropa | June 22, 1948 |
| 2,443,740 | Kropa | June 22, 1948 |
| 2,479,828 | Geckler | Aug. 23, 1949 |
| 2,485,294 | Kropa | Oct. 18, 1949 |
| 2,528,235 | Loritsch | Oct. 31, 1950 |
| 2,539,404 | Crutchfield | Jan. 30, 1951 |